United States Patent
Gibson

(10) Patent No.: US 11,053,859 B2
(45) Date of Patent: Jul. 6, 2021

(54) GAS TURBINE ENGINE HAVING A METALLIC TEST SAMPLE AND A METHOD OF DETERMINING THE SERVICE LIFE OF A GAS TURBINE ENGINE COMPONENT USING A METALLIC TEST SAMPLE

(71) Applicant: ROLLS-ROYCE plc, London (GB)

(72) Inventor: Grant J. Gibson, Derby (GB)

(73) Assignee: ROLLS-ROYCE plc, London (GB)

( * ) Notice: Subject to any disclaimer, the term of this patent is extended or adjusted under 35 U.S.C. 154(b) by 346 days.

(21) Appl. No.: 16/298,611

(22) Filed: Mar. 11, 2019

(65) Prior Publication Data
US 2019/0292992 A1     Sep. 26, 2019

(30) Foreign Application Priority Data
Mar. 20, 2018   (GB) .................................. 1804420.6

(51) Int. Cl.
*F02C 7/30*     (2006.01)
*F02C 3/04*     (2006.01)
(Continued)

(52) U.S. Cl.
CPC ................ *F02C 7/30* (2013.01); *F01D 21/00* (2013.01); *F01D 21/003* (2013.01); *F02C 3/04* (2013.01);
(Continued)

(58) Field of Classification Search
CPC . F02C 7/30; F02C 3/04; G01M 15/14; G01M 15/02; G01N 17/043; F01D 21/003; F01D 21/10; F01D 21/00
See application file for complete search history.

(56) References Cited

U.S. PATENT DOCUMENTS

| 7,574,904 B1 | 8/2009 | Davies et al. |
| 8,006,544 B2 | 8/2011 | Holmes et al. |
| (Continued) | | |

FOREIGN PATENT DOCUMENTS

| EP | 3260843 A1 | 12/2017 |
| EP | 3462033 A1 | 4/2019 |
| (Continued) | | |

OTHER PUBLICATIONS

Jul. 12, 2019 Search Report issued in European Patent Application No. 19 16 1543.

(Continued)

*Primary Examiner* — Steven M Sutherland
*Assistant Examiner* — Rodolphe Andre Chabreyrie
(74) *Attorney, Agent, or Firm* — Oliff PLC

(57) ABSTRACT

A method of determining the service life of a gas turbine engine component comprises providing, within a gas turbine engine, a component having an air washed surface, the component comprises a metal, wherein the air washed surface receives a supply of cooling air from a chamber within the gas turbine engine. The method also comprises mounting a metallic test sample within the chamber so as to be located in the supply of air which is delivered to the air washed surface. The metallic test sample is constructed of the same metal as the component. The method further comprises removing the metallic test sample and determining the degree of corrosion of the metallic test sample.

20 Claims, 5 Drawing Sheets

(51) Int. Cl.
  *G01M 15/02*  (2006.01)
  *G01M 15/14*  (2006.01)
  *F01D 21/00*  (2006.01)
(52) U.S. Cl.
  CPC ............ *G01M 15/02* (2013.01); *G01M 15/14* (2013.01); *F05D 2260/80* (2013.01)

(56) References Cited

U.S. PATENT DOCUMENTS

| | | |
|---|---|---|
| 8,475,110 B2 | 7/2013 | Hefner et al. |
| 8,540,936 B2 | 9/2013 | Hefner et al. |
| 9,200,984 B2 | 12/2015 | Green et al. |
| 2002/0153873 A1* | 10/2002 | Shapiro ................ G01N 17/006 324/71.2 |
| 2004/0055391 A1* | 3/2004 | Douglas ............... G01N 17/046 73/779 |
| 2009/0068060 A1* | 3/2009 | Alfermann ............ G01N 17/04 422/53 |
| 2011/0027063 A1* | 2/2011 | Hefner ................... G01N 17/02 415/1 |
| 2011/0251721 A1* | 10/2011 | Hefner ................... G01N 17/02 700/275 |
| 2013/0089463 A1* | 4/2013 | Hefner ................... G01N 17/02 422/53 |
| 2014/0076060 A1 | 3/2014 | Balandier |
| 2015/0168262 A1 | 6/2015 | Green et al. |
| 2015/0233789 A1 | 8/2015 | Balandier |
| 2016/0091411 A1* | 3/2016 | Hedtke ................. G01N 17/00 324/700 |
| 2016/0139029 A1* | 5/2016 | Belsom .................... G01L 7/00 422/53 |

FOREIGN PATENT DOCUMENTS

| | | |
|---|---|---|
| GB | 1444990 A | 8/1976 |
| GB | 1499550 A | 2/1978 |
| JP | H05118204 A | 5/1993 |

OTHER PUBLICATIONS

Sep. 20, 2018 Search Report issued in British Patent Application GB1804420.6.

* cited by examiner

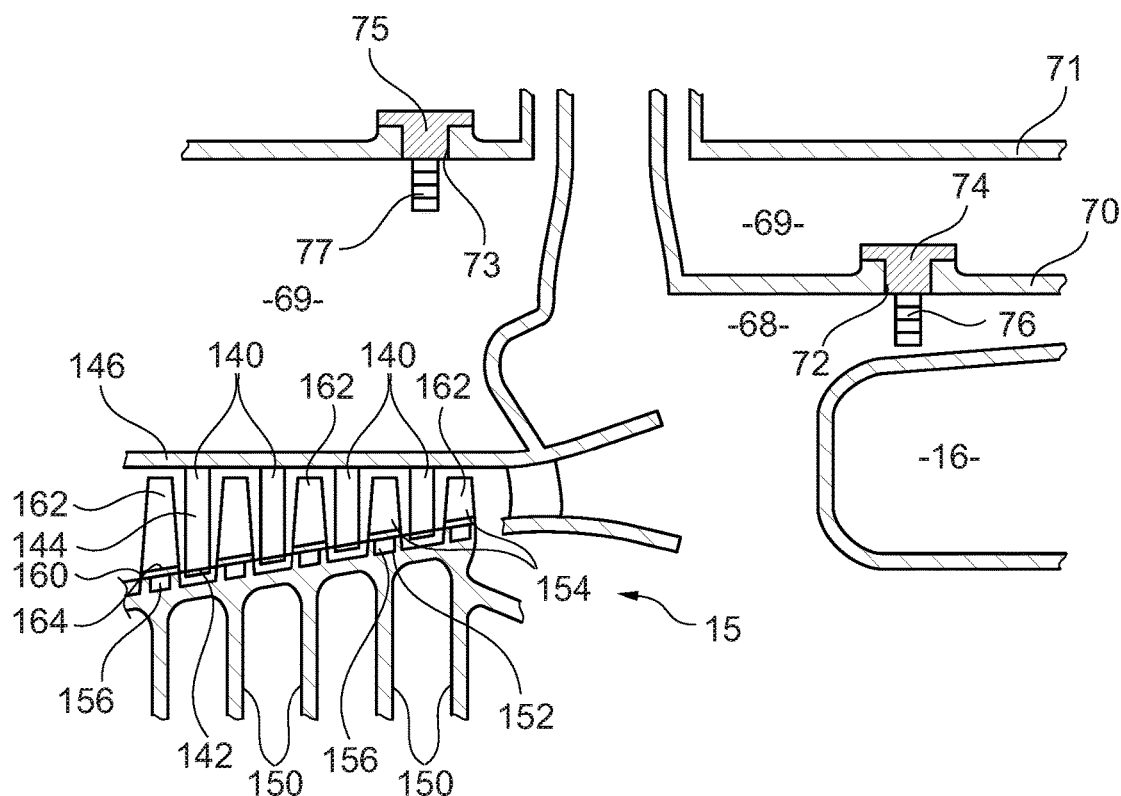
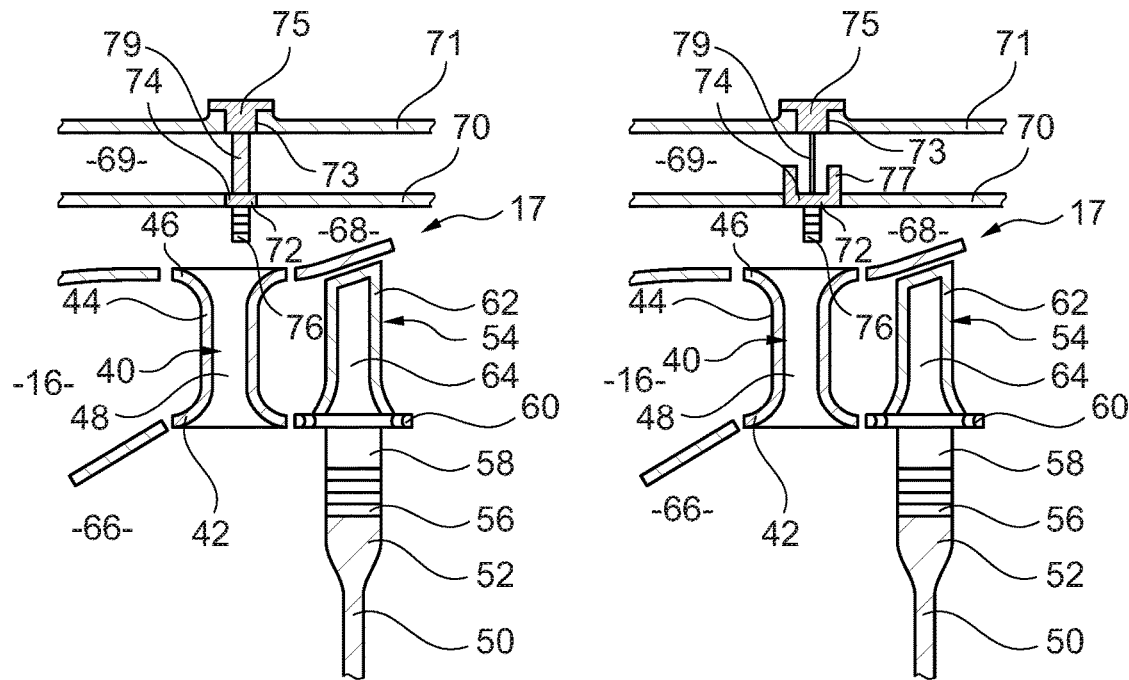
Fig. 8
Fig. 9
Fig. 10

GAS TURBINE ENGINE HAVING A METALLIC TEST SAMPLE AND A METHOD OF DETERMINING THE SERVICE LIFE OF A GAS TURBINE ENGINE COMPONENT USING A METALLIC TEST SAMPLE

The present disclosure relates to a gas turbine engine having a metallic test sample and a method of determining the service life of a gas turbine engine component using a metallic test sample.

Gas turbine engines comprise a compressor, a combustion chamber and a turbine. The compressor comprises a number of components, e.g. a compressor drum or compressor discs, compressor blades and compressor vanes. The combustion chamber comprises a number of components e.g. an outer wall and an inner wall of tiles. The turbine comprises a number of components e.g. turbine discs, turbine blades and turbine vanes. The components of the compressor, combustion chamber and/or the turbine may be exposed to corrosives and hence may suffer from corrosion.

The components of the combustion chamber and turbine generally comprise nickel alloys, e.g. nickel superalloys, and some of the components of the compressor, e.g. compressor discs, may comprise nickel alloys e.g. nickel superalloys. These nickel alloys may suffer from hot corrosion or sulphidation. Some of the compressor components may comprise other alloys, e.g. steel which may suffer from other types of corrosion.

Currently the components are assessed for corrosion when the gas turbine engine is examined in a service centre.

According to a first aspect there is provided a gas turbine engine, comprising:
 a component having a gas path facing surface and an air cooled surface, wherein the air cooled surface is arranged to receive a supply of cooling air, the gas path facing surface is arranged to receive a supply of hot gas, the component comprises a metal;
 a chamber in fluid communication with the air cooled surface, in operation the chamber is arranged to supply air to the air cooled surface or the chamber is arranged to receive air which has been supplied to the air cooled surface;
 a metallic test sample mounted within the chamber so as to be located in the air which is to be delivered to the air cooled surface or to be located in the air delivered by the air cooled surface, wherein the metallic test sample is constructed of the same metal as the component or a similar metal to the component.

The gas turbine engine may include a plurality of metallic test samples. The plurality of metallic test samples may be located at one circumferential position around a principal axis of the gas turbine engine. The metallic test samples may be located at a plurality of circumferential positions around a principal axis of the gas turbine engine. A plurality of metallic test samples may be located at each of the circumferential positions around the principal axis of the gas turbine engine. Each metallic test sample may be removably secured on a boroscope plug. Each metallic test sample may be connected to an adjacent metallic test sample by a frangible connection.

The component may comprise a nickel alloy, a titanium alloy or a steel alloy.

The gas turbine engine comprises at least one compressor and at least one turbine.

The component may comprise a turbine blade, a turbine vane, a turbine shroud, a turbine disc or a turbine blisk. The component may be a compressor blade, a compressor vane, a compressor disc, a compressor drum, a compressor blisk or a compressor blum.

The component may be a compressor blade or a compressor vane and the chamber is a duct to supply cooling air from the compressor to the turbine.

The component may be a turbine blade, a turbine vane, a turbine shroud or a turbine disc and the chamber is a duct to supply cooling air from the compressor to the turbine.

According to a second aspect there is provided a method of determining the service life of a gas turbine engine component, comprising:
 providing, within a gas turbine engine, a component having a gas path facing surface and an air cooled surface, the component comprises a metal;
 supplying air to the air cooled surface;
 supplying hot gas to the gas path facing surface;
 supplying air from a chamber within the gas turbine engine to the air cooled surface or supplying air from the air cooled surface to a chamber within the gas turbine engine;
 mounting a metallic test sample within the chamber so as to be located in the supply of air which is delivered to the air cooled surface or to be located in the supply of air which is delivered by the air cooled surface, wherein the metallic test sample is constructed of the same metal as the component or a similar metal to the component;
 removing the metallic test sample and
 determining the degree of corrosion of the metallic test sample.

The method may further comprise:
 removing the metallic test sample after a first period of operation;
 determining the degree of corrosion of the metallic test sample;
 determining whether the component is suitable for a second period of operation on the basis of the degree of corrosion of the metallic test sample; and,
 returning the gas turbine engine to service without replacing the component.

The method may further comprise:
 providing a plurality of metallic test samples within the gas turbine engine;
 removing at least one of the plurality of metallic test samples and retaining some of the plurality of metallic test samples within the gas turbine engine for the second period of operation.

The method may further comprise:
 removing at least one of the plurality of metallic test samples after the second period of operation;
 determining the degree of corrosion of the metallic test sample;
 determining whether the component is suitable for a third period of operation on the basis of the degree of corrosion of the metallic test sample;
 retaining some of the plurality of metallic test samples within the gas turbine engine for the third period of operation and,
 returning the gas turbine engine to service without replacing the component.

The determining of the degree of corrosion of the metallic test sample may comprise determining the amount of metal loss from the metallic test sample. The determining the amount of metal loss from the metallic test sample may comprise cross-sectioning the metallic test sample and measuring one or more of the thickness of an oxide layer from the outer surface of the metallic test sample, the corrosion pit depth from an inner surface of the oxide layer and the depth of internal corrosion of the metallic test sample from the bottom of a corrosion pit.

Determining whether the component is suitable for a second period of operation may comprise comparing the degree of corrosion of the metallic test sample with a database of corrosion damage for exposure time versus exposure temperature versus salt level exposure for the metal.

The method may comprise returning the gas turbine engine to service without replacing the component for a second period of operation which is less than the first period of operation, if there is higher degree of corrosion than expected.

The method may comprise returning the gas turbine engine to service without replacing the component for a second period of operation which is equal to the first period of operation.

The method may comprise returning the gas turbine engine to service without replacing the component for a second period of operation which is more than the first period of operation, if there is lesser degree of corrosion than expected.

The method may comprise returning the gas turbine engine to service without replacing the component for a third period of operation which is less than the second period of operation, if there is higher degree of corrosion than expected.

The method may comprise returning the gas turbine engine to service without replacing the component for a third period of operation which is equal to the second period of operation.

The method may comprise returning the gas turbine engine to service without replacing the component for a third period of operation which is more than the second period of operation, if there is higher degree of corrosion than expected.

The lower degree of corrosion than expected and the higher degree of corrosion than expected are relative to the database of corrosion damage for exposure time versus exposure temperature versus salt level exposure for the metal.

The method may further comprise:
providing, within the gas turbine engine, a second component having a second gas path facing surface and a second air cooled surface, the second component comprises a second metal, the second metal and the metal are different metals,
supplying air to the second air cooled surface;
supplying hot gas to the second gas path facing surface;
supplying air from the chamber within the gas turbine engine to the second air cooled surface or supplying air from the second air cooled surface to the chamber within the gas turbine engine;
mounting a second metallic test sample within the chamber so as to be located in the supply of air which is delivered to the second air cooled surface or to be located in the supply of air which is delivered by the second air cooled surface, wherein the second metallic test sample is constructed of the same metal as the second component or a similar metal to the second component;
removing the second metallic test sample and
determining the degree of corrosion of the second metallic test sample.

The method may further comprise:
removing the metallic test sample and the second metallic test sample after the first period of operation;
determining the degree of corrosion of the metallic test sample;
determining the degree of corrosion of the second metallic test sample;
determining whether the component is suitable for a second period of operation on the basis of the degree of corrosion of the metallic test sample;
determining whether the second component is suitable for a second period of operation on the basis of the degree of corrosion of the second metallic test sample;
and,
returning the gas turbine engine to service without replacing the first component and without replacing the second component.

The length of the second period of operation may be determined by the one of the metallic test sample and the second metallic test sample which has the greatest degree of corrosion.

The method may comprise predicting the remaining working lifetime of the component from the degree of corrosion of the metallic test sample after the first period of operation and removing the component from the gas turbine engine before the component has operated in the gas turbine engine for a period of time equal to the remaining working lifetime.

The method may comprise predicting the remaining working lifetime of the component from the degree of corrosion of the metallic test sample after a second period of operation and removing the component from the gas turbine engine before the component has operated in the gas turbine engine for a period of time equal to the remaining working lifetime.

The method may further comprise:
providing, within the gas turbine engine, a second component having a second gas path facing surface and a second air cooled surface, the second component comprises a second metal, the second metal and the metal are different metals,
supplying air to the second air cooled surface;
supplying hot gas to the second gas path facing surface;
supplying air from a second chamber within the gas turbine engine to the second air cooled surface or supplying air from the second air cooled surface to the second chamber within the gas turbine engine;
mounting a second metallic test sample within the second chamber so as to be located in the supply of air which is delivered to the second air cooled surface or to be located in the supply of air which is delivered by the second air cooled surface, wherein the second metallic test sample is constructed of the same metal as the second component or a similar metal to the second component;
removing the second metallic test sample and
determining the degree of corrosion of the second metallic test sample.

The method may further comprise:
removing the metallic test sample and the second metallic test sample after the first period of operation;
determining the degree of corrosion of the metallic test sample;
determining the degree of corrosion of the second metallic test sample;
determining whether the component is suitable for a second period of operation on the basis of the degree of corrosion of the metallic test sample;

determining whether the second component is suitable for a second period of operation on the basis of the degree of corrosion of the second metallic test sample; and, returning the gas turbine engine to service without replacing the first component and without replacing the second component.

The method may comprise:

mounting a metallic test sample within the chamber so as to be located in the supply of air which is delivered to the air cooled surface or to be located in the supply of air which is delivered by the air cooled surface, wherein the metallic test sample is constructed of the same metal as the component:

mounting a second metallic test sample within the chamber so as to be located in the supply of air which is delivered to the air cooled surface or to be located in the supply of air which is delivered by the air cooled surface, wherein the second metallic test sample is a similar metal to the component;

removing the metallic test sample and the second metallic test sample: and determining the degree of corrosion of the metallic test sample and the degree of corrosion of the second metallic test sample.

The method of determining whether the component is suitable for a second period of operation comprises comparing the degree of corrosion of the second metallic test sample after the first period of operation with a database of corrosion damage for exposure time versus exposure temperature versus salt level exposure for the similar metal.

The method may comprise comparing the degree of corrosion of the metallic test sample with the degree of corrosion of the second metallic test sample to provide scaling factors to determine the working life of the component.

According to a third aspect there is provided a method of determining the service life of a gas turbine engine component, comprising:

providing, within a gas turbine engine, a component having an air washed surface, the component comprises a metal;

supplying air to the air washed surface;

supplying air from a chamber within the gas turbine engine to the air washed surface or supplying air from the air washed surface to a chamber within the gas turbine engine;

mounting a metallic test sample within the chamber so as to be located in the supply of air which is delivered to the air washed surface or to be located in the supply of air which is delivered by the air washed surface, wherein the metallic test sample is constructed of the same metal as the component or a similar metal to the component;

removing the metallic test sample and determining the degree of corrosion of the metallic test sample.

According to a fourth aspect there is provided a gas turbine engine for an aircraft comprising:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan so as to drive the fan at a lower rotational speed than the core shaft, wherein:

the gas turbine engine further comprising:

a component having an air washed surface, the component comprises a metal;

a chamber in fluid communication with the air washed surface, in operation the chamber is arranged to supply air to the air washed surface or the chamber is arranged to receive air which has been supplied to the air washed surface;

a metallic test sample mounted within the chamber so as to be located in the air which is to be delivered to the air washed surface or to be located in the air delivered by the air washed surface, wherein the metallic test sample is constructed of the same metal as the component or a similar metal to the component.

The turbine may be a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which:

FIG. 8 is an enlarged cross-sectional through a high-pressure compressor of the gas turbine engine shown in FIG. 1.

FIG. 9 is an alternative cross-sectional view through a high-pressure turbine of the gas turbine engine shown in FIG. 1.

FIG. 10 is a further alternative cross-sectional view through a high-pressure turbine of the gas turbine engine shown in FIG. 1.

Figure 1:
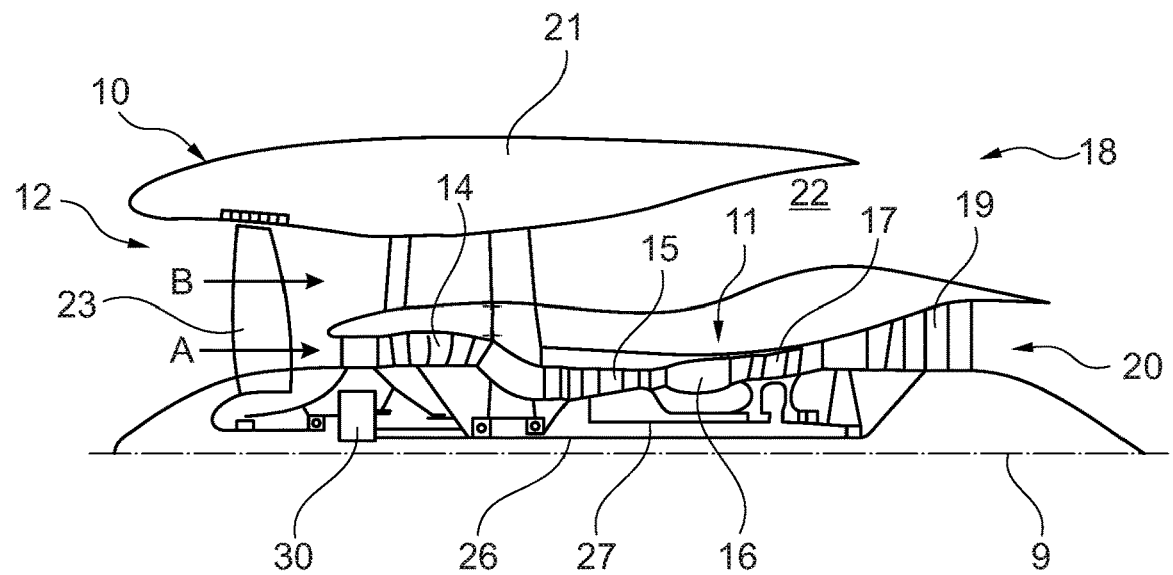
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
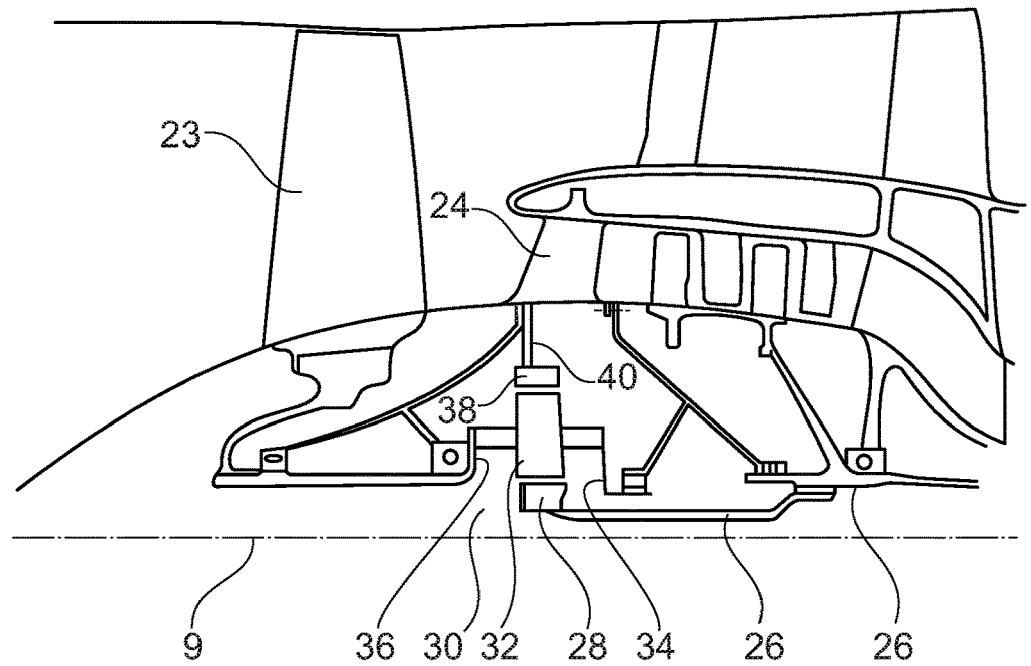
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
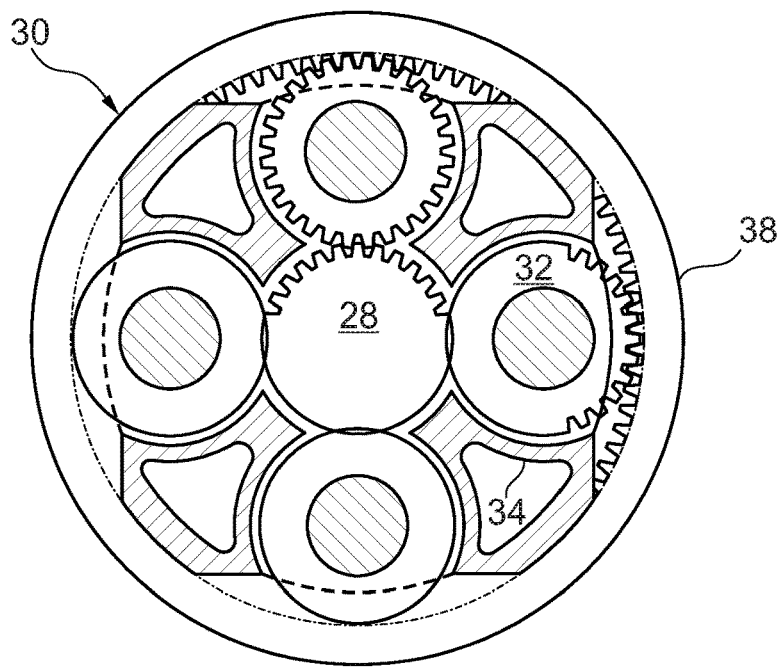
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The present disclosure proposes the use of an embedded metallic test sample within an operating engine in order to determine the level of corrosion which may be experienced by in-service components. The metallic test sample may be located in an environment which is representative of the component operating conditions. The exact location will be dependent on the conditions which need to be monitored. The metallic test sample may be placed in a location which replicates the most harmful environment for the working component. This may be a cooled side of the component, rather than the main gas path side. Hence, for a high pressure turbine component, the test sample may be mounted to any structure which is subjected to the same cooling air flow as the metallic component in question. For example, the metallic test sample may be mounted directly to or adjacent to a cooled side of the component. Alternatively, the metallic test sample may be mounted in a cooling air chamber which receives substantially the same pressure and/or temperature cooling air as the air cooled component. The metallic test sample may be placed in a cooling air supply duct which channels are to the air washed surface, e.g. air cooled surface, of the component.

The component which is to be assessed may be a compressor component, a combustion chamber component or a turbine component amongst others. For example, the compressor component may be a compressor drum, a compressor disc, a compressor blade or a compressor vane. The compressor blade may include a root, a shank, a platform and an aerofoil. The compressor vane may include an inner platform, an aerofoil and an outer platform. The compressor components may comprise a titanium alloy or a nickel alloy, e.g. a nickel superalloy. The combustion chamber component may be a combustion chamber liner, a combustion chamber tile or a combustion chamber segment. The turbine component may be a turbine blade, a turbine vane, a turbine shroud or a turbine disc. The turbine blade may include a root, a shank, a platform, an aerofoil and internal passages. The turbine vane may include an inner platform, an aerofoil, an outer platform and internal passages. The combustion chamber components and the turbine components may comprise a nickel alloy, e.g. a nickel superalloy. Under certain operating conditions nickel alloys may undergo corrosion which degrades the material and may lead to a reduction in strength. The corrosion may occur at the temperatures experienced by the air washed surfaces, air cooled surfaces, of the cooled side of a turbine blade, a turbine vane, a turbine shroud or a turbine disc, e.g. the surfaces of the internal passages, the under platform surfaces, the surfaces of the shanks of a turbine blade, the surfaces of the internal passages, the under platform surfaces of the inner platform, the over platform surfaces of the outer platform of a turbine vane or the outer surfaces of a turbine disc.

Figure 4:
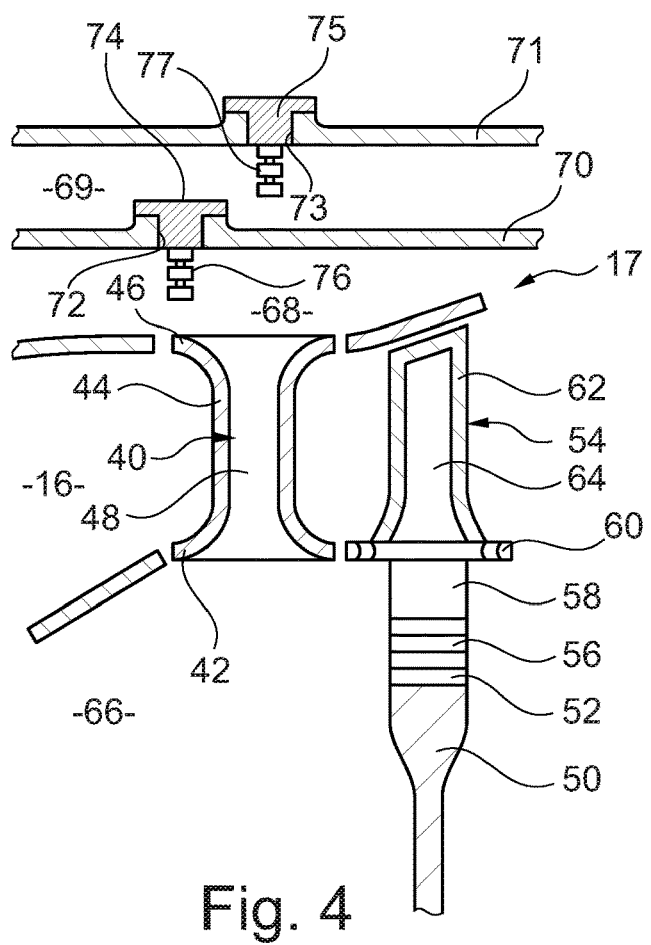
FIG. 4 is a cross-sectional view through a high-pressure turbine of the gas turbine engine shown in FIG. 1.

FIG. 4 shows the high-pressure turbine 17 in more detail. The high pressure turbine 17 comprises a plurality of circumferentially arranged turbine nozzle guide vanes 40 at the exit of the combustion equipment 16. Each nozzle guide vane 40 comprises an inner platform, a radially inner platform, 42, an aerofoil 44 and an outer platform, a radially outer platform 46 and has internal passages 48 at least within the aerofoil 44 and internal passages 48 may be in the radially inner platform 42 and the radially outer platform 46 which receive coolant, air, to cool the nozzle guide vane 40. The high pressure turbine 17 also comprises a plurality of circumferentially arranged turbine blades 54 in flow series, downstream of, the turbine nozzle guide vanes 40. The turbine blades 54 are mounted on a turbine disc 50. In particular each turbine blade 54 comprises a root 56, a shank 58, a platform 60 and an aerofoil 62. The roots 56 may be firtree roots or dovetail roots. The turbine disc 50 has a plurality of circumferentially spaced slots 52, each one of which receives a root 56 of a turbine blade 54. Each turbine blade 54 has internal passages 64 within the aerofoil 62 and internal passages 64 may be in the platform 60, the shank 58 and the root 56 which receive coolant, air, to cool the turbine blade 54. The coolant, air, is supplied from the high pressure compressor 15 to cool the high pressure turbine 17. Some of the coolant from the high pressure compressor 15 flows through a chamber or ducts 66 radially inboard of the combustion equipment 16 and this coolant flows radially outwardly over the upstream surface of the turbine disc 50. Some of this coolant flows along the slots 52 and radially outwardly into the internal passages 64 within the turbine blades 54 and some of the coolant flows over the surfaces of the shanks 58 and over the radially inner, under, surfaces of the platforms 60 of the turbine blades 54. Some of this coolant flows radially outwardly into the passages 48 within the nozzle guide vanes 40 and some coolant flows over the radially inner, under, surfaces of the inner platforms 42 of the nozzle guide vanes 40. Some of the coolant from the high pressure compressor 15 flows through a chamber or ducts 68 radially outboard of the combustion equipment 16 and this flows radially inwardly into the internal passages 48 within the nozzle guide vanes 40 and some coolant flows over the radially outer, over, surfaces of the outer platforms 44 of the nozzle guide vanes 40.

The chamber or ducts 66 may be defined by a casing arranged coaxially within the combustion equipment 16 of the gas turbine engine 10. The chamber or ducts 68 may be defined by a casing 70 arranged coaxially around the combustion equipment 16 of the gas turbine engine 10 and the casing 70 may have one or more borescope apertures 72 which have borescope plugs 74 to seal the borescope apertures 72. The borescope apertures 72 allow a borescope to be inserted into the gas turbine engine 10 to inspect the components of the gas turbine engine 10. One or more of the borescope plugs 74 has a metallic test sample 76 which, when the borescope plug 74 is located in the respective borescope aperture 72, protrudes into the duct 68 such that the metallic test sample 76 is exposed to the coolant, air, within the duct 68. The metallic test sample, or metallic test samples, 76 may be removably secured on the respective borescope plug 74. It may be possible to provide one or more metallic test samples within the chamber or ducts 66. A further casing 71 is arranged coaxially around the combustion equipment 16 of the gas turbine engine 10 and also around the casing 70 to define a further chamber or duct 69 with the casing 70. The casing 71 may have one or more borescope apertures 73 which have borescope plugs 75 to seal the borescope apertures 73. One or more of the borescope plugs 75 has a metallic test sample 77 which, when the borescope plug 75 is located in the respective borescope aperture 73, protrudes into the duct 69 such that the metallic test sample 77 is exposed to the coolant, air, within the duct 69. The chamber 68 receives compressed air from the downstream end of the high pressure compressor 15. The chamber 69 receives compressed air from a position of the high pressure compressor 15 between its upstream and downstream ends, e.g. compressed air at a lower pressure and a lower temperature than the compressed air in the chamber 68.

The surfaces of the shanks 58 and/or the radially inner, under, surfaces of the platforms 60 and/or the internal passages 64 of the turbine blades 54 may suffer from corrosion, sulphidation. Similarly, the radially inner, under, surfaces of the inner platforms 42 and/or the radially outer, over, surfaces of the outer platforms 44 and/or the internal passages 48 of the nozzle guide vanes 40 may suffer from corrosion, sulphidation. The upstream surface of the turbine disc 50 may suffer from corrosion, sulphidation. The turbine nozzle guide vanes 40 may comprise a first nickel superalloy, CMSX4®, CMSX10®, Rene® 77, Rene® N5, Rene® N6, PWA1484, PW1497, IN738, IN718 or TMS138A, the turbine blades 54 may comprises a second nickel superalloy, CMSX4®, CMSX10®, Rene® 77, Rene® N5, Rene® N6, PWA1484, PW1497, IN738, IN718 or TMS138A and the turbine disc 50 may comprise a third nickel superalloy alloy, e.g. Waspaloy®, RR1000. The radially inner, under, surfaces of the platforms 60 and/or the internal passages 64 of the turbine blades 54 may have a protective coating comprising nickel, e.g. a diffused platinum coating, an aluminide coating or a MCrAlY coating. The radially inner, under, surfaces of the inner platforms 42 and/or the radially outer, over, surfaces of the outer platforms 44 and/or the internal passages 48 of the nozzle guide vanes 40 may have a protective coating comprising nickel, e.g. a diffused platinum coating, an aluminide coating or a MCrAlY coating. The aluminide coating may be a simple aluminide coating, a chromium aluminide coating, a platinum aluminide coating, a platinum chromium aluminide coating or a silicide aluminide coating.

Figure 5:
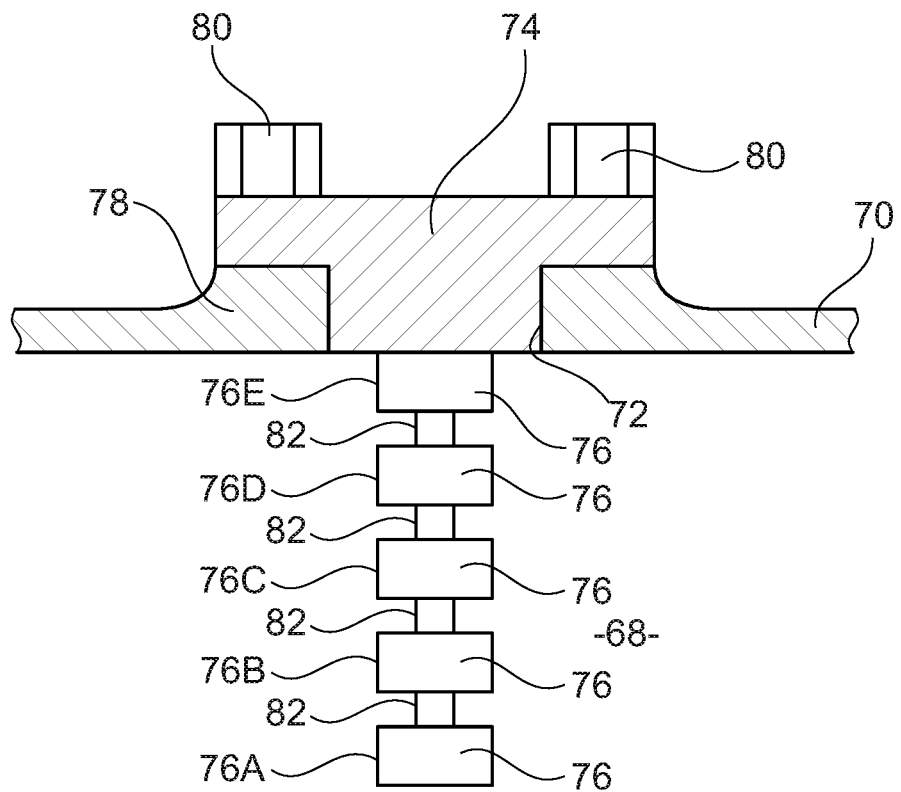
FIG. 5 is an enlarged cross-sectional view of a casing of the high pressure turbine showing a borescope plug and a plurality of metallic test samples.

The casing 70, a borescope aperture 72, borescope plug 74 and a plurality of metallic test samples 76 are shown more clearly in FIG. 5. The borescope plug 74 locates in and seals the borescope aperture 72 and is removably secured to a boss 78 on the casing 70 by a number of fasteners, e.g. bolts 80. The metallic test samples 76 are secured to the radially inner end of the borescope plug 74. The metallic test samples 76 are cylindrical, are arranged coaxially and each metallic test sample 76 is connected to an adjacent metallic test sample 76 by a frangible connection 82. All the metallic test samples 76 have the same composition, the same diameter and length. Each frangible connection 82 has the same composition as the metallic test pieces 76 and comprises a metallic cylinder which has a smaller diameter than the metallic test samples 76. All of the metallic test samples 76 on the borescope plug 74 are thus located at one circumferential position relative to the principal rotational axis 9 of the gas turbine engine 10. The metallic test samples 76 may have a diameter of about 10 mm and a length of about 10 mm, the frangible connections 82 may have a diameter of about 5 mm and a length of about 3 mm.

A plurality of borescope plugs 74 may have each have a plurality of metallic test samples 76 secured to the radially inner end of the respective borescope plug 74, as described above. The borescope apertures 72 and borescope plugs 74 and metallic test samples 76 are circumferentially arranged, spaced apart, around the casing 70, e.g. the metallic test samples 76 may be distributed around the principal rotational axis 9 of the gas turbine engine 10.

The metallic test samples 76 on each of the borescope plugs 74 has the same composition and the metallic test samples 76 on all of the borescope plugs 74 may have the same composition. Alternatively, the metallic test samples 76 on each of the borescope plugs 74 has the same composition, but the metallic test samples 76 on one or more of the borescope plugs 74 may have different compositions to the metallic test samples 76 on one or more of the borescope plugs 74 in order to carry out tests for components made from different metals at the same time. Some of the metallic test samples 76 may have the same composition as the turbine blades 54, some of the metallic test samples 76 may have the same composition as the turbine nozzle guide vanes 40, some of the metallic test samples 76 may have the same composition as the turbine disc 50, some of the metallic test samples 76 may have the same composition as the protective coating, e.g. aluminide coating or MCrAlY coating.

The metallic test sample, or metallic test samples, 76 are attached to the borescope plugs 74 and inserted into the borescope apertures 72 in the casing 70. In operation of the gas turbine engine 10 coolant, cooling air, from the high pressure compressor 15 flows through ducts 68 radially outboard of the combustion equipment 16 and then flows radially inwardly into the internal passages 48 within the nozzle guide vanes 40 and some of the cooling air flows over the radially outer, over, surfaces of the outer platforms 44 of the nozzle guide vanes 40. The cooling air also flows over the metallic test samples 76 within the ducts 68 and thus the metallic test samples 76 are exposed to corrosion environment similar to that experienced by the turbine nozzle guide vanes 40, turbine blades 54 or turbine disc 50.

The method of determining the service life of a gas turbine engine component comprises providing, within a gas turbine engine 10, a component 40, 50, 54 having an air washed surface, the component 40, 50, 54 comprises a metal; supplying air from a chamber 66, 68 within the gas turbine engine 10 to the air washed surface, mounting a metallic test sample 76 within the chamber so as to be located in the supply of air which is delivered to the air washed surface, wherein the metallic test sample 76 is constructed of the same metal as the component 40, 50, 54 or a similar metal to the component 40, 50, 54; removing the metallic test sample and determining the degree of corrosion of the metallic test sample. In particular the method of determining the service life of a gas turbine engine component comprises providing, within the gas turbine engine 10, a component 40, 50, 54 having an air cooled surface, the component 40, 50, 54 comprises a metal, wherein the air cooled surface receives a supply of cooling air from a chamber 66, 68, within the gas turbine engine 10, which holds the cooling air for delivery to the air cooled surface; mounting a metallic test sample 76 within the chamber 66, 68 so as to be located in the supply of cooling air which is delivered to the air cooled surface, wherein the metallic test sample 76 is constructed of the same metal as the component 40, 50, 54, removing the metallic test sample 76 and determining the degree of corrosion of the metallic test sample 76.

The method of determining the service life of a gas turbine engine component comprises providing, within the gas turbine engine 10, a component 40, 54 having a gas path facing surface and an opposing air cooled surface, the component 40, 54 comprises a metal, wherein the air cooled surface receives a supply of cooling air from a chamber 68, within the gas turbine engine 10, which holds the cooling air for delivery to the air cooled surface; mounting a metallic test sample 76 within the chamber 68 so as to be located in the supply of cooling air which is delivered to the air cooled surface, wherein the metallic test sample 76 is constructed of the same metal as the component 40, 54, removing the metallic test sample 76 and determining the degree of corrosion of the metallic test sample 76.

The method may further comprise removing the metallic test sample 76 after a first period of operation, determining the degree of corrosion of the metallic test sample 76, determining whether the component is suitable for a second period of operation on the basis of the degree of corrosion of the metallic test sample 76 and returning the gas turbine engine 10 to service without replacing the component. The method may further comprise providing a plurality of metallic test samples 76 within the gas turbine engine 10, removing at least one of the plurality of metallic test samples 76 and retaining some of the plurality of metallic test samples 76 within the gas turbine engine 10 for the second period of operation. The method may further comprise removing at least one of the plurality of metallic test samples 76 after the second period of operation, determining the degree of corrosion of the metallic test sample 76, determining whether the component is suitable for a third period of operation on the basis of the degree of corrosion of the metallic test sample 76, retaining some of the plurality of metallic test samples 76 within the gas turbine engine 10 for the third period of operation and returning the gas turbine engine 10 to service without replacing the component. The first, second and third periods of operation may each be 500 cycles, e.g. for an aero gas turbine engine 500 flights, or 500 hours. In particular, referring to FIG. 5, after the first period of operation the borescope plug 74 is removed from the gas turbine engine 10 and the metallic test sample 76A is removed from the borescope plug 74, and hence the gas turbine engine 10, by breaking/cutting the frangible connection 82 and the degree of corrosion of the metallic test sample 76A is determined. The borescope plug 74 and the metallic test samples 76B, 76C, 76D and 76E are reinserted into the gas turbine engine 10 and the gas turbine engine 10 is operated for a second period of operation. After the second period of operation the borescope plug 74 is removed from the gas turbine engine 10 and the metallic test sample 76B is removed from the borescope plug 74, and hence the gas turbine engine 10, by breaking/cutting the frangible connection 82 and the degree of corrosion of the metallic test sample 76B is determined, the metallic test sample 76B has been subjected to the first and second periods of operation of the gas turbine engine 10. The borescope plug 74 and the metallic test samples 76C, 76D and 76E are reinserted into the gas turbine engine 10 and the gas turbine engine 10 is operated for a third period of operation. After the third period of operation the borescope plug 74 is removed from the gas turbine engine 10 and the metallic test sample 76C is removed from the borescope plug 74, and hence the gas turbine engine 10, by breaking/cutting the frangible connection 82 and the degree of corrosion of the metallic test sample 76C is determined, the metallic test sample 76C has been subjected to the first, second and third periods of operation of the gas turbine engine 10. The borescope plug 74 and the metallic test samples 76D and 76E are reinserted into the gas turbine engine 10 and the gas turbine engine 10 is operated for a fourth period of operation. Similarly, the degree of corrosion of the metallic test sample 76D is determined after a fourth period of operation and the metallic test sample 76D has been subjected to the first, second, third and fourth periods of operation of the gas turbine engine 10. Likewise, the degree of corrosion of the metallic test sample 76E is determined after a fifth period of operation and the metallic test sample 76E has been subjected to the first, second, third, fourth and fifth periods of operation of the gas turbine engine 10.

Figure 6:
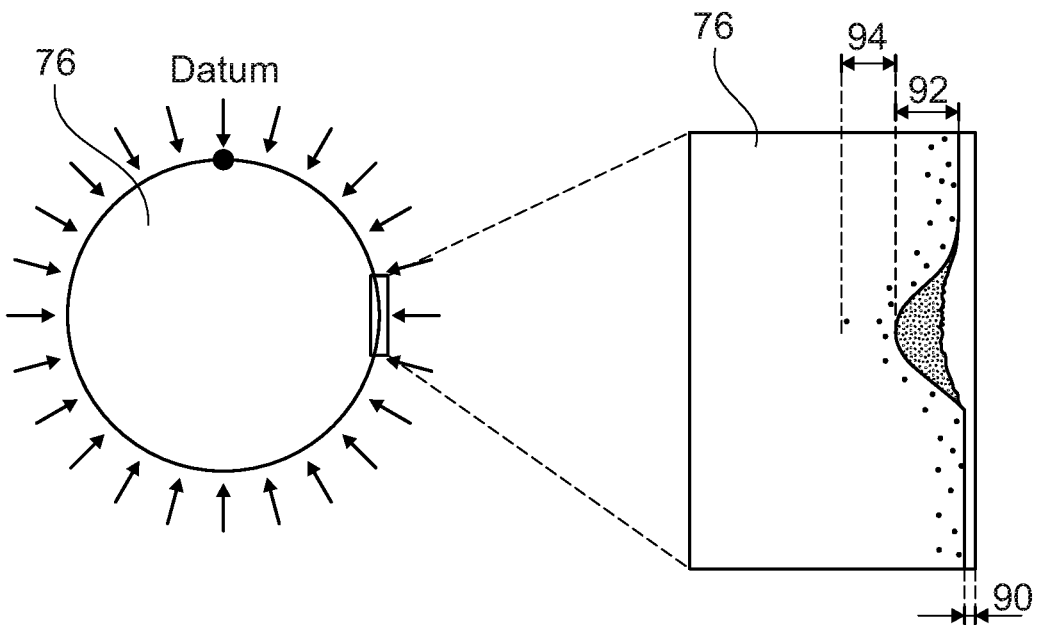
FIG. 6 is a schematic diagram illustrating the method of determining the degree of corrosion of the metallic test sample.

The determining of the degree of corrosion of a metallic test sample 76 after the first, second or third period of operation may comprise determining the amount of metal loss from the metallic test sample 76. The metal loss may comprise measuring the weight of the metallic test sample 76 before the period of operation and after the period of operation. The metal loss may comprise destructively testing the metallic test sample 76 by cross-sectioning, cutting the metallic test sample in half radially of the metallic test sample 76. The cross-sectioned metallic test sample 76 is then inspected and measurements of the thickness of an oxide layer 90 from the radially outer surface of the metallic test sample 76, the corrosion pit depth 92 from the radially inner surface of the oxide layer 90 and the depth of internal corrosion 94 of the metallic test sample 76 from the bottom of a corrosion pit at twenty four equally circumferentially spaced points on the circumference of the metallic test sample 76, as shown in FIG. 6. The measurements of the thickness of an oxide layer 90, the corrosion pit depth 92 and the depth of internal corrosion 94 are taken using a microscope, for example an automated stage microscope. This data is then compared with the data before testing of the metallic test sample 76 or the data from the testing of one or more metallic test sample 76 after one or more previous periods of operation. The data may be used to determine the minimum, maximum, median and mean metal loss. For each metallic test sample 76 assessed the probability of corrosion losses greater than the measured value may be calculated using the equation $1-(n/25)\times 100\%$, where n is the index number of the ordered data and thus for twenty four measurement points the probability of corrosion losses greater than the measured value is 4%. The thickness of oxide layer 90, the corrosion pit depth 92, the depth of internal corrosion 94, the thickness of oxide layer 90 and the corrosion pit depth 92, the corrosion pit depth 92 and the depth of internal corrosion 94, thickness of oxide layer 90 and the depth of internal corrosion 94 or the thickness of oxide layer 90, the corrosion pit depth 92 and the depth of internal corrosion 94 may be used as a measure of the amount of metal loss from the metallic test sample 76.

Figure 7:
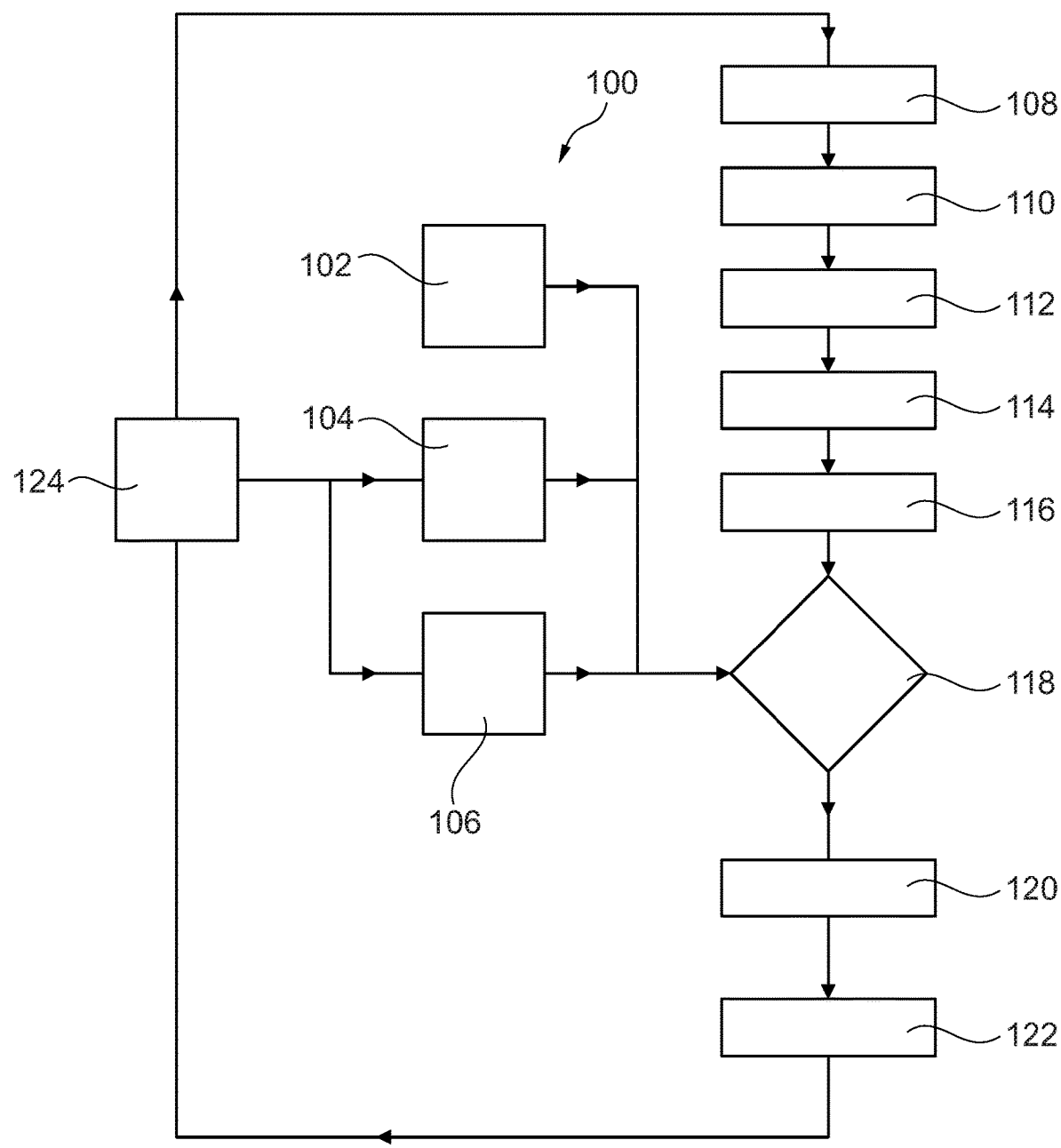
FIG. 7 is a flow chart for a method of determining the service life of a gas turbine engine component.

FIG. 7 shows a method of determining the service life of a gas turbine engine component. The method uses a laboratory generated database of corrosion damage for exposure time versus exposure temperature versus salt level exposure for a metal 104, e.g. a laboratory generated database of corrosion damage for exposure time versus exposure temperature versus salt level exposure for one or more alloys, e.g. a nickel base alloys, steel alloys etc. The database of corrosion damage for exposure time versus exposure temperature versus salt level exposure for a metal for example includes data for one or more alloys, e.g. nickel base alloys, steel alloys etc. The database of corrosion damage for exposure time versus exposure temperature versus salt level exposure for a metal 104 is produced by applying salt solution at 0.25 to 10 $\mu g/cm^2/hr$ to metal samples, evaporating at 200° C. and placing in a corrosive atmosphere of air and sulphur dioxide for a predetermined period of time of 50 to 500 hrs and greater than 500 at a predetermined temperature, 600° C. to 750° C. and then measuring the degree of corrosion for each metal sample. The database of corrosion damage for exposure time versus exposure temperature versus salt level exposure for a metal 104 is produced by applying salt solution at 0.5 to 8 µg/cm$^2$/hr, more preferably 1 to 5 µg/cm$^2$/h, to metal samples, evaporating at 200° C. and placing in a corrosive atmosphere of air and sulphur dioxide for a predetermined period of time of 50 to 500 hrs and greater than 500 at a predetermined temperature, 600° C. to 750° C. and then measuring the degree of corrosion for each metal sample. Examples comprise applying salt solution at 5 µg/cm$^2$/hr and 10 µg/cm$^2$/hr to metal samples, evaporating at 200° C. and placing in a corrosive atmosphere of air containing 300 ppm sulphur dioxide, for different predetermined periods of time of 50 to 500 hrs and greater than 500 hours at a predetermined temperature of 700° C. and then measuring the degree of corrosion for each sample.

The method may also use a laboratory generated database of corrosion versus fatigue properties for a metal 106, e.g. a laboratory generated database of corrosion versus fatigue properties for one or more alloys, e.g. a nickel base alloys, steel alloys etc. The method may also use a database of corrosion damage from metal components previously in service in a gas turbine engine 102, e.g. a database of corrosion damage from nickel alloy, nickel base superalloy, components previously in service in a gas turbine engine 102.

A period of operation, e.g. 500 cycles or 500 hours, for the gas turbine engine 10 between inspections is set at 108. One, or more, metallic test samples are placed in the duct in the gas turbine engine 110. The gas turbine engine is operated for a first period of operation e.g. 500 cycles or 500 hours, 112. One, or more, metallic test samples are removed from the gas turbine engine 114 and the degree of corrosion of each metallic test sample is determined 116 by determining the amount of metal loss as described with reference to FIG. 6. Then the degree of corrosion of the metallic sample, the amount of metal loss, is compared with the laboratory generated database of corrosion damage for exposure time versus exposure temperature versus salt level exposure for a metal 104. The degree of corrosion of the metallic test sample as determined at 116 by determining the amount of metal loss is cross-calibrated 120 with the laboratory generated database of corrosion damage for exposure time versus exposure temperature versus salt level exposure for a metal 104. If the degree of corrosion of the metallic test sample determined at 116 by determining the amount of metal loss is less than the amount of corrosion of the same metal in the laboratory generated database of corrosion damage for exposure time versus exposure temperature versus salt level exposure for a metal 104 then the predicted life for the metal component may be increased. On the contrary, if the degree of corrosion of the metallic test sample determined at 116 by determining the amount of metal loss is more than the amount of corrosion of the same metal in the laboratory generated database of corrosion damage for exposure time versus exposure temperature versus salt level exposure for a metal 104 then the predicted life for the metal component may be decreased. Thus, the working life of the metal component is predicted 122. As a result of the cross-calibration 120 the period of operation 108 of the gas turbine engine between inspections may be reset. If the degree of corrosion of the metallic test sample determined at 116 by determining the amount of metal loss is considerably less than the amount of corrosion of the same metal in the laboratory generated database of corrosion damage for exposure time versus exposure temperature versus salt level exposure for a metal 104 then the period of operation may be increased from 500 cycles, or 500 hours, to say 1000 cycles or 1000 hours. On the contrary, if the degree of corrosion of the metallic test sample determined at 116 by determining the amount of metal loss is more than the amount of corrosion of the same metal in the laboratory generated database of corrosion damage for exposure time versus exposure temperature versus salt level exposure for a metal 104 then the period of operation may be decreased from 500 cycles, or 500 hours, to say 250 cycles or 250 hours.

FIG. 8 shows the high-pressure compressor 15 in more detail. The high pressure compressor 15 comprises a plurality of axially spaced stages of compressor vanes 140 each of which comprises a plurality of circumferentially arranged compressor vanes. Each compressor vane 140 comprises an inner platform, a radially inner platform, 142, an aerofoil 144 and an outer platform, a radially outer platform 146. The high pressure compressor 15 also comprises a plurality of axially spaced stages of compressor blades 154 each of which comprises a plurality of circumferentially arranged compressor blades. The compressor blades 154 are mounted on compressor discs 150. In particular each compressor blade 154 comprises a root 156, a platform 160 and an aerofoil 162. The compressor discs 150 have slots 152 to receive the roots 156 of the compressor blades 154. The roots 156 may be dovetail roots or firtree roots. In this example each compressor disc 150 has a single circumferentially extending slot 150, but may be provided with a plurality of circumferentially spaced slots. The high pressure compressor 15 also has one or more bleed apertures 164 to bleed compressed air from the high pressure compressor 15 and to supply the compressed air to the chamber 69. The compressed air in the chamber 69 may be used as a coolant to cool turbine components or may be used for other purposes. The compressed air exiting the high pressure compressor 15 is supplied into the chamber 68. The compressed air in the chamber 68 is supplied into the combustion equipment 16, is used as a coolant to cool the combustion equipment 16, is used as a coolant to cool the high pressure turbine 17 components or may be used for other purposes.

FIG. 8 also shows borescope apertures 72 and 73 in the casings 70 and 71 respectively and corresponding borescope plugs 74 and 75 and metallic test samples 76 and 77 respectively. In operation of the gas turbine engine 10 air flows through intermediate pressure compressor 14 into the high pressure compressor 15 and the air flows over the radially inner surfaces of the outer platforms 146, the surfaces of the aerofoils 144 and the radially outer surfaces of the inner platforms 142 of the compressor vanes 140. The air also flows over the radially outer surfaces of the platforms 160 and the surfaces of the aerofoils 162 of the compressor blades 154. The air then flows over the metallic test samples 76 and 77 within the ducts 68 69 respectively and thus the metallic test samples 76 and 77 are exposed to corrosion environment similar to that experienced by the compressor vanes 140 and compressor blades 154.

FIG. 9 shows the high-pressure turbine 17 and is similar to FIG. 4 and like parts are denoted by like numerals. FIG. 9 differs in that the, or each, borescope aperture 72 in the casing 70 is aligned with a respective borescope aperture 73 in the casing 71. The, or each, borescope plug 74 is connected to a respective borescope plug 75 by a connecting rod 79. The, or each borescope plug 74 has one or more metallic samples 76 which protrude into the duct 68. The metallic test samples 76 may be the same metal as, or a similar metal to, a metal component.

FIG. 10 shows the high-pressure turbine 17 and is similar to FIG. 4 and like parts are denoted by like numerals. FIG. 9 differs in that the, or each, borescope aperture 72 in the casing 70 is aligned with a respective borescope aperture 73 in the casing 71. The, or each, borescope plug 74 is connected to a respective borescope plug 75 by a connecting rod 79. The, or each, borescope plug 74 has one or more metallic samples 76 which protrude into the duct 68. The, or each, borescope plug 74 has a metallic sample 77 which protrude into the duct 69. The metallic test sample 77 is tubular and is arranged around the connecting rod 79. The metallic test samples 76 may be the same metal as, or a similar metal to, a metal component. The metallic test samples 77 may be the same metal as, or a similar metal to, a metal component. Alternatively, it may be possible to provide an arrangement in which the, or each, borescope plug 74 is connected to a respective borescope plug 75 by a connecting rod 79 and the, or each, borescope plug 74 only has a metallic sample 77 which protrude into the duct 69. The metallic test sample 77 is tubular and is arranged around the connecting rod 79. The metallic test samples 77 may be the same metal as, or a similar metal to, a metal component.

A method of determining the service life of a gas turbine engine component comprises providing, within the gas turbine engine 10, a component 140, 150, 154 having an air washed surface, the component 140, 150, 154 comprises a metal; supplying air to the air washed surface; supplying air from the air washed surface to a chamber 68, 69 within the gas turbine engine 10; mounting a metallic test sample 76, 77 within the chamber 68, 69 so as to be located in the supply of air which is delivered by the air washed surface, wherein the metallic test sample 76, 77 is constructed of the same metal as the component 140, 150, 154 or a similar metal to the component 140, 150, 154; removing the metallic test sample 76, 77 and determining the degree of corrosion of the metallic test sample 76, 77.

Although the use of cylindrical metallic test sample has been described it is equally possible to use metallic test samples with other cross-sectional shapes, e.g. rectangular, oval, triangular, pentagonal, hexagonal etc. Although twenty four points equally circumferentially spaced points on the circumference of the metallic test sample has been used to determine the metal loss it may be equally possible to use other suitable number of points equally circumferentially spaced points on the circumference of the metallic test sample. Although the use of circumferentially spaced points on the circumference of the metallic test sample has been used to determine the metal loss it may be equally possible to use points spaced along the perimeter of the metallic test sample, for a metallic test sample with another cross-sectional shape.

Although the description has referred to metallic test samples located on a borescope plug it may be equally possible to locate the metallic test sample or test samples within the duct close to a borescope aperture such that the metallic test sample may be easily removed from the gas turbine engine at the end of a period of operation, e.g. 500 cycles or 500 hours, 250 cycles or 250 hours, 100 cycles or 1000 hours.

Although the description has referred to the corrosion by sulphidation of nickel alloy components it is equally applicable to other types of corrosion of nickel alloys, it is also applicable to corrosion of titanium alloys or steel alloys, and it is applicable to other types of corrosion, e.g. galvanic corrosion of nickel, titanium or steel. Galvanic corrosion occurs where two different metals are in electrical contact and have different electrode potentials such that one metal preferentially corrodes.

Although the description has referred to providing one or more metallic test samples in the gas turbine engine which are the same metal as one metal component of the gas turbine engine and are supplied with cooling air from the same chamber or duct it is equally possible to provide one or more second metallic test sample in the gas turbine engine which are the same metal as a second metallic component of the gas turbine engine and are supplied with cooling air from the same chamber or duct or it is equally possible to provide one or more second metallic test samples in the gas turbine engine which are the same metal as a second metallic component of the gas turbine engine and to provide one or more third metallic test samples in the gas turbine engine which are the same metal as a third metallic component of the gas turbine engine and are supplied with cooling air from the same chamber or duct. For example the high pressure turbine blades and the high pressure turbine disc are supplied with cooling air from the high pressure compressor and consist of different materials, e.g. different nickel alloys, and the first metallic test sample may be provided for the high pressure turbine blades and the second metallic test sample may be provide for the high pressure turbine disc. Alternatively, the high pressure turbine blades and the high pressure turbine nozzle guide vanes are supplied with cooling air from the high pressure compressor and consist of different materials, e.g. different nickel alloys, and the first metallic test sample may be provided for the high pressure turbine blades and the second metallic test sample may be provide for the high pressure turbine nozzle guide vanes. Similarly, the high pressure turbine blades, the high pressure turbine nozzle guide vanes and the high pressure turbine disc are all supplied with cooling air from the high pressure compressor and consist of different materials, e.g. different nickel alloys, and the first metallic test sample may be provided for the high pressure turbine blades, the second metallic test sample may be provide for the high pressure turbine disc and the third metallic test sample may be provided for the high pressure turbine nozzle guide vanes.

Although the description has referred to providing one or more metallic test samples in the gas turbine engine which are the same metal as one metal component of the gas turbine engine and are supplied with cooling air from the same chamber or duct it is equally possible to provide one or more second metallic test sample in the gas turbine engine which are the same metal as a second metallic component of the gas turbine engine and are supplied with cooling air from a different chamber or duct. For example the high pressure turbine blades and the low pressure turbine blades are supplied with cooling air from the high pressure compressor and low pressure compressor respectively and consist of different materials, e.g. different nickel alloys, and the first metallic test sample may be provided for the high pressure turbine blades and the second metallic test sample may be provide for the low pressure turbine blades.

Although the description has referred to providing one or more metallic test samples in the gas turbine engine which are the same metal as one metal component of the gas turbine engine it is equally possible to provide one or more metallic test samples in the gas turbine engine which are a similar metal to the metal component. Likewise it possible to provide one or more second metallic test samples in the gas turbine engine which are a similar metal to a second metal component of the gas turbine engine. The metallic test sample, or metallic samples, may be a similar metal to the metal component. For example the metallic test sample(s) may be C1023 and the metal component may be CMSX4®, the metallic test sample(s) may be C263 and the metal component may be CMSX4® or the metallic test sample(s) may be MAR M® 002 and the metal component may be CMSX4®.

It may be equally possible for the metallic test sample to be a stressed metallic test sample, or the metallic test samples to be stressed metallic test samples, e.g. the metallic test sample, or metallic test samples, are placed in the gas turbine engine in a stressed condition for example have a static load applied to them. This enables the inclusion of the effect of stress load or stress rate on the corrosion of the metallic test sample or metallic test samples to be generated.

The method of determining the service life of a gas turbine engine component builds a database of corrosion damage depths in a much shorter time periods than currently achievable. The method of determining the service life of a gas turbine engine component is able to cross-correlate the level of corrosion damage in the metallic test sample to a laboratory generated database of corrosion damage, e.g. to cross-correlate with a database of laboratory generated database of corrosion damage for exposure time versus exposure temperature versus salt level exposure. The method of determining the service life of a gas turbine engine component provides a cheap, simple way to create a database of absolute corrosion experienced by a component in a gas turbine engine in a much reduced number of cycles than is currently available, e.g. every 500 cycles or 500 hours, compared to shop visits.

The method of determining the service life of a gas turbine engine component cross-correlates to a large laboratory generated database of corrosion damage to enable the calibration with a database of corrosion-fatigue testing and also enables and estimation of actual corrosion levels in a gas turbine engine on a flight by flight basis. The method of determining the service life of a gas turbine engine component is designed to capture a "true" sample of corrosion conditions within the gas turbine engine. The method of determining the service life of a gas turbine engine component provides data for a predictive model which determines, or predicts, which components, turbine nozzle guide vanes, turbine blades or turbine discs etc., should be removed from the gas turbine engine so as to prevent an in-flight shut down event.

The method of determining the service life of a gas turbine engine component places one or more metallic test samples in the path of corrosive species within the gas turbine engine and thus the metallic test samples are corroded within and during operation of the gas turbine engine. The metallic test sample, or metallic test samples, are removed, easily and quickly, from the gas turbine engine, for example via borescope aperture during borescope inspection and passed to a laboratory. The metallic test samples are cross-sectioned and examined for corrosion attack and the results from the examination are cross-correlated to the pre-existing corrosion databases mentioned above. The results from the examination of the metallic test samples from a gas turbine engine may be cross-correlated engine to the pre-existing corrosion databases and are used to build a time versus corrosion versus operating condition history, e.g. flight history. The operation condition history may include the geographical location of operation of the gas turbine engine and the type of operation, e.g. long haul flight/intercontinental flight, short haul flight/inter country flight/intra country flight, of the gas turbine engine. The invention is able to provide a cheap method of inspecting gas turbine engines to determine the corrosion rate of metallic components within gas turbine engines prior to an in-flight shut down event and to remove and replace or repair the metallic component prior to an in-flight shut down event if the degree of corrosion is above a predetermined amount.

The method of determining the service life of a gas turbine engine component takes the determined degree of corrosion of a metallic test sample corresponding to a metal component after a first period of operation of the gas turbine engine and places it in a database for that particular gas turbine engine. The method of determining the service life of a gas turbine engine component takes the determined degree of corrosion of a further metallic test sample corresponding to the metal component after the first and a second period of operation of the gas turbine engine and places it in the database for that particular gas turbine engine. The method of determining the service life of a gas turbine engine component takes the determined degree of corrosion of additional metallic test samples corresponding to the metal component after first, second and subsequent periods of operation of the gas turbine engine and places it in the database for that particular gas turbine engine.

The method of determining the service life of a gas turbine engine component may take the degree of corrosion of metallic test samples corresponding to a second metal component after different periods of operation for that particular gas turbine engine.

The method of determining the service life of a gas turbine engine component may take the degree of corrosion of metallic test samples corresponding to a metal component after different time periods of operation for other gas turbine engines.

The method may comprise mounting a metallic test sample within the chamber so as to be located in the supply of air which is delivered to the air washed surface or to be located in the supply of air which is delivered by the air washed surface, wherein the metallic test sample is constructed of the same metal as the component, mounting a second metallic test sample within the chamber so as to be located in the supply of air which is delivered to the air washed surface or to be located in the supply of air which is delivered by the air washed surface, wherein the metallic test sample is a similar metal to the component, removing the metallic test sample and the second metallic test sample and determining the degree of corrosion of the metallic test sample and the second metallic test sample.

The use of a second metallic test sample, or second metallic test samples, which is/are a similar metal to the metal component and a metallic test sample, or metallic test samples, which is/are the same metal as the component is particularly useful if the database of information for the metal component is limited. The degree of corrosion of the second metallic test sample(s) is compared with a laboratory generated database of corrosion damage for exposure time versus exposure temperature versus salt level exposure for the similar metal. The degree of corrosion of the metallic test sample, or metallic test samples, are compared with the degree of corrosion of the second metallic test sample, or second metallic test samples, to provide scaling factors to determine the working life of the component. For example the second metallic test samples may be IN718 and the metallic test samples may be CMSX4® or the second metallic test samples may be TMS138A and the metallic test samples may be CMSX4®. For example the second metallic test sample(s) may be C1023 and the metallic test sample(s) may be CMSX4®, the second metallic test sample(s) may be C263 and the metallic test sample(s) may be CMSX4® or the second metallic test sample(s) may be MAR M® 002 and the metallic test sample(s) may be CMSX4®.

A similar metal is a metal which is of the same base type as the metal component. If the metal component comprises a nickel alloy, a nickel superalloy, then the similar metal is also a nickel alloy, a nickel superalloy, but a different nickel alloy, nickel superalloy. If the metal component comprises a cobalt alloy, a cobalt superalloy, then the similar metal is also a cobalt alloy, a cobalt superalloy, but a different cobalt alloy, cobalt superalloy. If the metal component comprises a cobalt alloy, a cobalt superalloy, then the similar metal is also a cobalt alloy, a cobalt superalloy, but a different cobalt alloy, cobalt superalloy. If the metal component comprises an iron alloy, an iron superalloy, then the similar metal is also an iron alloy, an iron superalloy, but a different iron alloy, iron superalloy.

The similar metal may be a metal which corrodes quicker than the metal component and the data from the similar metal may be correlated to the metal of the metal component.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine, comprising:
   a component having a gas path facing surface and an air cooled surface, wherein the air cooled surface is arranged to receive a supply of cooling air, the gas path facing surface is arranged to receive a supply of hot gas, the component comprises a metal;
   a chamber in fluid communication with the air cooled surface, in operation the chamber is arranged to supply air to the air cooled surface or the chamber is arranged to receive air which has been supplied to the air cooled surface;
   a plurality of metallic test samples mounted within the chamber so as to be located in the air which is to be delivered to the air cooled surface or to be located in the air delivered by the air cooled surface, wherein each test sample of the plurality of metallic test samples is connected to an adjacent metallic test sample by a frangible connection and is constructed of the metal of the component or a similar metal to the component.

2. The gas turbine engine as claimed in claim 1, wherein the plurality of metallic test samples are located at one circumferential position around a principal axis of the gas turbine engine.

3. The gas turbine engine as claimed in claim 1, wherein the plurality of metallic test samples are located at a plurality of circumferential positions around a principal axis of the gas turbine engine.

4. The gas turbine engine as claimed in claim 3, wherein several metallic samples of the plurality of metallic test samples are located at each of the circumferential positions around the principal axis of the gas turbine engine.

5. The gas turbine engine as claimed in claim 1, wherein each metallic test sample of plurality of metallic test samples is removably secured on a boroscope plug.

6. The gas turbine engine as claimed in claim 1, wherein the component comprises one of a nickel alloy, a titanium alloy and a steel alloy.

7. The gas turbine engine as claimed in claim 1, wherein the component comprises one of a turbine blade, a turbine vane, a turbine shroud, a turbine disc, a turbine blisk, a compressor blade, a compressor vane, a compressor disc, a compressor drum, a compressor blisk and a compressor blum.

8. A method of determining a service life of a component of a gas turbine engine, comprising:
   providing, within the gas turbine engine, the component having a gas path facing surface and an air cooled surface, wherein the air cooled surface is arranged to receive a supply of cooling air, the gas path facing surface is arranged to receive a supply of hot gas, the component comprises a metal;
   supplying the cooling air to the air cooled surface;
   supplying the hot gas to the gas path facing surface;
   supplying the cooling air from a chamber within the gas turbine engine to the air cooled surface or supplying the cooling air from the air cooled surface to the chamber within the gas turbine engine;
   mounting a plurality of metallic test samples within the chamber so as to be located in the supply of the cooling air which is delivered to the air cooled surface or to be located in the supply of the cooling air which is delivered by the air cooled surface, wherein each test sample of the plurality of the metallic test samples is connected to an adjacent metallic test sample by a frangible connection and constructed of the metal of the component or a similar metal to the component;
   removing the plurality of metallic test samples and determining a degree of corrosion of the plurality of metallic test samples.

9. The method as claimed in claim 8, further comprising:
   removing the plurality of metallic test samples after a first period of operation;
   determining a degree of corrosion of the plurality of metallic test samples after the first period of operation;
   determining whether the component is suitable for a second period of operation based on the the degree of corrosion of the plurality of metallic test samples after the first period of operation; and,
   returning the gas turbine engine to service without replacing the component.

10. The method as claimed in claim 9, wherein determining whether the component is suitable for a second period of operation comprises comparing the degree of corrosion of the plurality of metallic test samples after the first period of operation with a database of corrosion damage for exposure time versus exposure temperature versus salt level exposure for the metal.

11. The method as claimed in claim 9, further comprising:
   removing at least one of the plurality of metallic test samples and retaining some of the plurality of metallic test samples within the gas turbine engine for the second period of operation.

12. The method as claimed in claim 11, further comprising:
   removing at least one of the some of the plurality of metallic test samples after the second period of operation;
   determining the degree of corrosion of the some of the metallic test sample after the second period of operation;
   determining whether the component is suitable for a third period of operation based on the degree of corrosion after the second period of operation;

retaining some of the some of the plurality of metallic test samples within the gas turbine engine for the third period of operation and, returning the gas turbine engine to service without replacing the component.

13. The method as claimed in claim 12, wherein determining whether the component is suitable for a third period of operation comprises comparing the degree of corrosion after the second period of operation with a database of corrosion damage for exposure time versus exposure temperature versus salt level exposure for the metal.

14. The method as claimed in claim 9, wherein the method comprises returning the gas turbine engine to service without replacing the component for a second period of operation which is less than the first period of operation or which is more than the first period of operation.

15. The method as claimed in claim 12, wherein the method comprises returning the gas turbine engine to service without replacing the component for a third period of operation which is less than the second period of operation or which is more than the second period of operation.

16. The method as claimed in claim 8, wherein determining the degree of corrosion comprises determining an amount of metal loss from the plurality of metallic test samples by cross-sectioning a metallic test sample of the plurality of metallic test samples and measuring one or more of a thickness of an oxide layer from an outer surface of a metallic test sample of the plurality of metallic test samples, a corrosion pit depth from an inner surface of the oxide layer and a depth of internal corrosion of one of the plurality of metallic test samples from a bottom of a corrosion pit.

17. The method as claimed in claim 8, further comprising: mounting the plurality of metallic test samples within the chamber so as to be located in the supply of the cooling air which is delivered to the cooling air cooled surface or to be located in the supply of the cooling air which is delivered by the air cooled surface, wherein the metallic test sample is constructed the metal as the component: mounting a second plurality of metallic test samples within the chamber so as to be located in the supply of the cooling air which is delivered to the cooling air cooled surface or to be located in the supply of the cooling air which is delivered by the air cooled surface, wherein the second plurality of metallic test samples is a similar metal to the component;
removing the plurality of metallic test samples and the second plurality of metallic test samples: and determining the degree of corrosion of the plurality of metallic test sample and a second degree of corrosion of the second plurality of metallic test samples.

18. The method as claimed in claim 17, comprising determining whether the component is suitable for a second period of operation comprises comparing the second degree of corrosion after the first period of operation with a database of corrosion damage for exposure time versus exposure temperature versus salt level exposure for the similar metal.

19. The method as claimed in claim 17, comprising comparing the degree of corrosion with the second degree of corrosion to provide scaling factors to determine the working life of the component.

20. A method of determining a service life of a gas turbine engine component of a gas turbine, comprising: providing, within the gas turbine engine, the component having an air washed surface, the component comprises a metal;
supplying air to the air washed surface;
supplying air from a chamber within the gas turbine engine to the air washed surface or supplying air from the air washed surface to the chamber within the gas turbine engine;
mounting a plurality of metallic test samples within the chamber so as to be located in the supply of air which is delivered to the air washed surface or to be located in the supply of air which is delivered by the air washed surface, wherein each test sample of the plurality of the metallic test samples is connected to an adjacent metallic test sample by a frangible connection and constructed of the metal of the component or a similar metal to the component removing the plurality of metallic test samples and determining a degree of corrosion of the plurality of metallic test samples.

\* \* \* \* \*